(12) United States Patent
Zhu et al.

(10) Patent No.: US 10,727,475 B2
(45) Date of Patent: Jul. 28, 2020

(54) PRECURSORS FOR LITHIUM TRANSITION METAL OXIDE CATHODE MATERIALS FOR RECHARGEABLE BATTERIES

(71) Applicants: Umicore, Brussels (BE); Umicore Korea Ltd., Chungnam (KR)

(72) Inventors: Liang Zhu, Cheonan (KR); Randy DePalma, Kessel-Lo (BE); Sung Jun Cho, SuWon (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 201 days.

(21) Appl. No.: 15/670,299

(22) Filed: Aug. 7, 2017

(65) Prior Publication Data

US 2018/0047975 A1 Feb. 15, 2018

Related U.S. Application Data

(60) Provisional application No. 62/372,957, filed on Aug. 10, 2016.

(30) Foreign Application Priority Data

Sep. 19, 2016 (EP) .................................. 16189471

(51) Int. Cl.
*H01M 4/52* (2010.01)
*H01M 4/131* (2010.01)
(Continued)

(52) U.S. Cl.
CPC .......... *H01M 4/131* (2013.01); *C01G 53/006* (2013.01); *H01M 4/505* (2013.01); *H01M 4/525* (2013.01);
(Continued)

(58) Field of Classification Search
CPC ...... H01M 4/131; H01M 4/505; H01M 4/525; C01G 53/006
See application file for complete search history.

(56) References Cited

U.S. PATENT DOCUMENTS 7,384,706 B2 6/2008 Wakasugi
7,585,432 B2 9/2009 Iida
(Continued)

FOREIGN PATENT DOCUMENTS

CN 103081189 A 5/2013
CN 103282310 A 9/2013
(Continued)

OTHER PUBLICATIONS

English Translation of JP 2011-113792 (Year: 2011).*
European Search Report for EP 16 18 9471, dated Dec. 2, 2016.

*Primary Examiner* — Ula C Ruddock
*Assistant Examiner* — Frank A Chernow
(74) *Attorney, Agent, or Firm* — NK Patent Law (57) ABSTRACT

A particulate precursor compound for manufacturing a lithium transition metal oxide powder for use as an active positive electrode material in lithium-ion batteries, the precursor having the general formula $Ni_xMn_yCo_zA_aO_v(OH)_w$, wherein $0.15<v<0.30$, $v+w=2$, $0.30 \leq x \leq 0.75$, $0.10 \leq y \leq 0.40$, $0.10 \leq z \leq 0.40$, A being a dopant with $a \leq 0.05$, and $x+y+z+a=1$, the precursor consisting of a crystal structure having an XRD pattern with twin peaks at $2\theta=38\pm0.5°$, the twin peaks having a left peak having a peak intensity $I_L$ and a right peak having a peak intensity $I_R$, and a peak intensity ratio $R=I_R/I_L$ with $R>0.7$, and the XRD pattern being free of peaks belonging to either one or both of a spinel and an oxyhydroxide compound.

8 Claims, 4 Drawing Sheets (51) Int. Cl.
*H01M 4/525* (2010.01)
*C01G 53/00* (2006.01)
*H01M 4/505* (2010.01)
*H01M 4/88* (2006.01)
*H01M 10/0525* (2010.01)
*H01M 10/052* (2010.01)
*C01G 51/00* (2006.01)
*G01N 23/20* (2018.01)

(52) U.S. Cl.
CPC ..... *H01M 4/8842* (2013.01); *H01M 10/0525* (2013.01); *C01G 51/44* (2013.01); *C01P 2002/50* (2013.01); *C01P 2002/52* (2013.01); *C01P 2002/54* (2013.01); *C01P 2002/72* (2013.01); *C01P 2002/74* (2013.01); *C01P 2002/76* (2013.01); *C01P 2002/77* (2013.01); *C01P 2004/61* (2013.01); *C01P 2006/40* (2013.01); *C01P 2006/82* (2013.01); *G01N 23/20* (2013.01); *H01M 10/052* (2013.01); *H01M 2220/20* (2013.01); *Y02E 60/122* (2013.01)

(56) References Cited

U.S. PATENT DOCUMENTS

| | | |
|---|---|---|
| 8,394,299 B2 | 3/2013 | Chang |
| 8,980,475 B2 | 3/2015 | Schroedle |
| 2009/0302267 A1 | 12/2009 | Malcus |

FOREIGN PATENT DOCUMENTS

| | | |
|---|---|---|
| CN | 104364201 A | 2/2015 |
| EP | 2261176 A1 | 12/2010 |
| EP | 3012227 A1 | 4/2016 |
| JP | 2011516384 A | 5/2011 |
| JP | 2011253808 A | 12/2011 |
| JP | 2015-003838 A | 1/2015 |
| WO | 2015/132647 | 9/2015 |

* cited by examiner

PRECURSORS FOR LITHIUM TRANSITION METAL OXIDE CATHODE MATERIALS FOR RECHARGEABLE BATTERIES

This application claims priority to U.S. Application Ser. No. 62/372,957, filed Aug. 10, 2016. This application also claims priority to European Application No. EP16189471.2, filed Sep. 19, 2016.

TECHNICAL FIELD AND BACKGROUND

The invention is related to precursors for lithium transition metal oxides for rechargeable batteries, the precursors having a unique characteristic to provide excellent battery materials for demanding technologies such as automotive applications.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g. Alternatives to $LiCoO_2$-based cathode materials include LNMCO type cathode materials. LNMCO means lithium-nickel-manganese-cobalt-oxides. The composition is $LiMeO_2$—wherein Me stands for metal, but covers also a doped metal—or $Li_{1+x}Me_{1-x}O_2$ where Me=$Ni_xCo_yMn_zA_m$ (which is more generally referred to as "NMC", A being one or more dopants). LNMCO has a similar layered crystal structure as $LiCoO_2$ (space group R-3m). The advantage of LNMCO cathodes is the much lower raw material price of the composition M versus pure Co. The addition of Ni gives an increase in discharge capacity, but is limited by a decreasing thermal stability with increasing Ni content. In order to compensate for this problem, Mn is added as a structural stabilizing element, but at the same time some capacity is lost.

The target lithium-containing composite oxide is generally synthesized by mixing a nickel-cobalt-manganese composite hydroxide as precursor material (having the same metal composition as the final cathode material will have) with a lithium compound and firing the mixture. The cell characteristics can be improved by substituting a part of nickel, cobalt and manganese by other metal elements, such as Al, Mg, Zr, Ti, Sn and Fe. The suitable substituting quantity is 0.1 to 10% of the total quantity of the nickel, cobalt and manganese atoms.

Generally, for the production of cathode materials with complex compositions, special precursors such as mixed transition metal hydroxides $Ni_xCo_yMn_z(OH)_2$ are used. The reason is that high performance $Li-M-O_2$ needs well mixed transition metal cations. To achieve this without "over sintering"—high temperature sintering for a longer period together with a lithium precursor, typically $Li_2CO_3$ or LiOH—the cathode precursors need to contain the transition metal in a well-mixed form—at atomic level—as provided in mixed transition metal hydroxides. Mixed hydroxides with suitable size and morphology are typically achieved by precipitation reactions with the following steps: (1) mixed hydroxides are precipitated in a reactor with a flow of NaOH and a flow of mixed metal salt under controlled pH, (2) the precursor suspension is removed and filtered, (3) the filtered wet cake is dried under defined conditions.

In U.S. Pat. No. 8,980,475 a process for preparing lithium mixed metal oxides is disclosed, which comprises the steps of:

a) the preparation of a mixture designated as intermediate (B) which comprises essentially lithium-comprising mixed metal hydroxides and lithium-comprising mixed metal oxide hydroxides, where manganese, cobalt and nickel are comprised in the ratio (1-a-b):a:b and the oxidation state averaged over all ions of manganese, cobalt and nickel is at least 4-1.75a-1.75b, where $0 \leq a \leq 0.5$ and $0.1 \leq b \leq 0.8$, by a thermal treatment carried out with continual mixing and in the presence of oxygen of a mixture (A) comprising at least one transition metal compound and at least one lithium salt (L), during which L does not melt, and b) the thermal treatment carried out without mixing and in the presence of oxygen of the intermediate (B).

U.S. Pat. No. 8,394,299 discloses a transition metal precursor comprising a composite transition metal compound represented by $M(OH_{1-x})_2$, as transition metal precursor used in the preparation of a lithium-transition metal composite oxide, wherein M is two or more selected from the group consisting of Ni, Co, Mn, Al, Cu, Fe, Mg, B, Cr and the transition metals of 2 period in the Periodic Table of the Elements; and $0 < x < 0.5$.

In U.S. Pat. No. 7,384,706 a method for manufacturing a lithium-nickel-cobalt-manganese-containing composite oxide $Li_pNi_xMn_{1-x-y}Co_yO_{2-q}F_q$ (where $0.98 \leq p \leq 1.07$, $0.3 \leq x \leq 0.5$, $0.1 \leq y \leq 0.38$, and is disclosed, comprising: a step for synthesizing coagulated particles of a nickel-cobalt-manganese composite hydroxide wherein primary particles obtained by precipitating the nickel-cobalt-manganese composite hydroxide are coagulated to form secondary particles, by supplying an aqueous solution of a nickel-cobalt-manganese salt, an aqueous solution of an alkali-metal hydroxide and an ammonium-ion donor continuously or intermittently to a reaction system; a step for synthesizing coagulated particles of a nickel-cobalt-manganese composite oxyhydroxide by making an oxidant act on said coagulated composite hydroxide particles; and a step for dry-blending at least said coagulated composite oxyhydroxide particles and a lithium salt, and firing the mixture in an oxygen-containing atmosphere.

US2009/0302267 discloses a precursor $Ni_bM1_cM2_e(O)_x(OH)_y$, wherein M1 denotes at least one element from the group consisting of Fe, Co, Mg, Zn, Cu and/or mixtures thereof, M2 denotes at least one element from the group consisting of Mn, Al, B, Ca, Cr and/or mixtures thereof, wherein $b \leq 0:8$, $c \leq 0.5$, $d \leq 0.5$ and x is a number between 0.1 and 0.8, y is a number between 1.2 and 1.9, and x+y=2.

U.S. Pat. No. 7,585,432 discloses a process for the production of high density cobalt-manganese coprecipitated nickel hydroxide $(Ni_{(1-x-y)}Co_xMn_y)(OH)_2$ particles (wherein $\frac{1}{10} \leq x \leq \frac{1}{3}$ and $\frac{1}{20} \leq y \leq \frac{1}{3}$); the process comprising the steps of: continuously supplying an aqueous solution of a nickel salt which contains a cobalt salt and a manganese salt, a complexing agent, and an alkali metal hydroxide into a reactor either in an inert gas atmosphere or in the presence of a reducing agent; continuously growing crystals of said particles; and continuously removing crystals of said particles from said reactor.

It is expected that in the future the lithium battery market will be increasingly dominated by automotive applications. Automotive applications require very large batteries that are expensive, and must be produced at the lowest possible cost. A significant fraction of the cost comes from the cathodes, i.e. the positive electrodes. Providing these electrodes by a cheap process can help to lower cost and boost market acceptance. The automotive market includes different major applications. Batteries for EV (purely electric vehicles) need to store energy for several hundreds of km of driving range, necessitating that the cells are very large and heavy. Obviously this requires the battery to have a volumetric energy density that is as high as possible. Apart from cell design and anode energy density, the cathode materials in such batteries also need to have a high capacity at a realistic rate. Battery sets for EV applications contain a big amount of NMC cathode material. Catastrophic exothermal reactions of one cell could induce a chain reaction in the battery and hence cause accidents—as has happened in the past. The battery safety needs to be optimized in all its different aspects, and the cathode material is one of it. EV applications normally require a battery to be used for ten years and within this time frame, the battery capacity should remain higher than 80%. During daily use, the battery's direct current resistance (DCR) will increase during cycling.

An important DCR increase means that more and more energy is lost during charging, and less and less power is available during driving. Keeping a low rate of DCR growth is one of the key for cathode material development for EV application.

If the DCR resistance is small, then the charge—discharge cycle is highly efficient; and only a small amount of ohmic heat evolves. To achieve these high power requirements the batteries contain cells with thin electrodes. This allows that (1) Li diffuses over only short distances and (2) current densities (per electrode area) are small, contributing to high power and low DCR resistance. Such high power batteries put severe requirements on the cathode materials: they must be able to sustain very high discharge or charge rates by contributing as little as possible to the overall battery DCR. In the past, it has been a problem to improve the DCR resistance of cathodes, as is discussed in WO2015/132647. Furthermore, it was a problem to limit the increase of DCR during the long term operation of the battery.

The present invention aims to provide improved precursors of lithium transition metal cathode materials for positive electrodes having an intermediate to high Ni content, made by a cheap process, and the cathode materials having a reduced irreversible capacity Qirr upon cycling in the secondary battery.

SUMMARY

Viewed from a first aspect, the invention can provide the following precursor embodiments:

Embodiment 1

A particulate precursor compound for manufacturing a lithium transition metal oxide powder for use as an active positive electrode material in lithium-ion batteries, the precursor having the general formula $Ni_xMn_yCo_zA_aO_v(OH)_w$, wherein $0.15<v<0.30$, $v+w=2$, $0.30 \le x \le 0.75$, $0.10 \le y \le 0.40$, $0.10 \le z \le 0.40$, A being a dopant with $a \le 0.05$, and $x+y+z+a=1$, the precursor consisting of a crystal structure having an XRD pattern with twin peaks at $2\theta=38\pm0.5°$, the twin peaks having a left peak having a peak intensity $I_L$ and a right peak having a peak intensity $I_R$, and a peak intensity ratio $R=I_R/I_L$ with $R>0.7$, and the XRD pattern being free of peaks belonging to either one or both of a spinel and an oxyhydroxide compound. The peak intensity ratio R may vary between >0.7 and infinity (+∞), the latter corresponding to a precursor consisting solely of oxidized $\beta(II)$-Me(OH)$_2$ (Me standing for the metal composition Ni—Mn—Co-A).

In different embodiments of the invention, A is either one or more of the elements of the group consisting of Al, Sn, Fe, Ga, B, Ti, Mg, W, Zr, Cr and V. A suitable substituting quantity may be between 0.1 and 5% of the total quantity of the nickel, cobalt and manganese atoms.

A dopant, also called a doping agent, is a trace impurity element that is inserted into a substance (in very low concentrations) in order to alter the electrical properties or the optical properties, in this case of the final product that will be made from the precursor.

Embodiment 2 the precursor having an XRD pattern with twin peaks at $2\theta=38\pm0.5°$, the twin peaks having a left peak and a right peak, wherein the left peak belongs to an XRD pattern of a $\beta(II)$-Me(OH)$_2$ structure and the right peak to an XRD pattern of an oxidized $\beta(II)$-Me(OH)$_2$ structure, and where the weight % of the $\beta(II)$-Me(OH)$_2$ structure in the precursor is more than 0 wt % and less than 48 wt %.

Embodiment 3 the precursor having an XRD pattern with additional twin peaks at $2\theta=33\pm0.5°$ and $52\pm0.5°$.

Embodiment 4 the precursor having a value for R<+∞.

Embodiment 5 for the precursor the weight % of the oxidized $\beta(II)$-Me(OH)$_2$ structure in the precursor is <95 wt %. In the case where R=+∞ the risk of formation of an undesired $\beta(III)$-MeOOH structure or of the even more oxidized spinel structure Me$_3$O$_4$ is high. Therefore the weight % of the oxidized $\beta(II)$-Me(OH)$_2$ structure in the precursor may be less than 95 wt %.

Embodiment 6 the precursor having the general formula $Ni_xMn_yCo_zO_v(OH)_w$, wherein $0.30 \le x \le 0.60$, $0.20 \le y \le 0.35$, $0.20 \le z \le 0.35$, and $x+y+z=1$.

Each of the individual precursor embodiments described here above can be combined with one or more of the precursor embodiments described before it.

Viewed from a second aspect, the invention can provide the following method embodiments:

Embodiment 7

A method for preparing the particulate precursor compound according to the invention, comprising the steps of:
providing a metal salt solution comprising Ni, Mn, Co and A,
adding an alkali hydroxide compound to the metal salt solution, thereby
precipitating a wet particulate precursor compound having a pure hydroxide crystal structure and comprising a quantity of H$_2$O,
drying the wet particulate precursor compound during a heat treatment at a temperature between 130° C. and 160° C. in vacuum, thereby lowering the H$_2$O content below 1 wt %, continuing to heat treat the dried precursor compound, thereby removing between 0.15 and 0.30 mole $H_2$ per mole pure hydroxide precursor, and cooling the dried particulate precursor compound to room temperature under vacuum. The cooling step is performed under vacuum to prevent oxidation or uptake of water. In this embodiment the quantities of Ni, Mn, Co and A correspond to the general formula $Ni_xMn_yCo_zA_a$, wherein $0.30 \leq x \leq 0.75$, $0.10 \leq y \leq 0.40$, $0.10 \leq z \leq 0.40$, A being a dopant with $a \leq 0.05$, and $x+y+z+a=1$.

It is understood that the precipitation yields a wet particulate precursor compound having a pure hydroxide crystal structure and that no partial oxidation or reduction of this hydroxide takes place before the drying step.

The quantity of hydrogen removed from the dry hydroxide precursor can be calculated by determining the valence state of the NMC metal in the precursor by known methods such as a titration in a Mettler Toledo Autotitrator DL70ES. When less than 0.15 mole hydrogen/mole hydroxide precursor is removed the weight fraction of the oxidized $\beta(II)$-$Me(OH)_2$ structure is too low, yielding a structure near to the ideal $\beta(II)$-$Me(OH)_2$ structure that will result in a lithiated material having inferior coin cell and full cell performances. When more than 0.30 mole hydrogen/mole hydroxide precursor is removed the formation of the $\beta(III)$-MeOOH structure or of the even more oxidized spinel structure $Me_3O_4$ inside the precursor cannot be avoided; and both lead to inferior performances of the lithiated final product.

Embodiment 8

The method for preparing a particulate precursor compound, wherein the step of cooling the dried particulate precursor compound to room temperature is performed under dry air.

Viewed from a third aspect, the invention can provide the following use

Embodiment 9

Use of the particulate precursor compound according to the invention for manufacturing a lithium transition metal oxide powder for use as an active positive electrode material in lithium-ion batteries.

Viewed from a fourth aspect, the invention can provide a method for manufacturing a lithium transition metal based oxide powder usable as an active positive electrode material in lithium-ion batteries, comprising the steps of:

providing a crystalline hydroxide precursor compound according to the first aspect of the invention, mixing the precursor with a lithium precursor compound, and sintering the mixture at a temperature between 750 and 1000° C. In an embodiment the mixture is sintered in trays carrying a load of at least 5 kg.

DETAILED DESCRIPTION

The precursor in this invention is a particulate (oxy-)hydroxide precursor compound for manufacturing a lithium transition metal oxide powder to be used as an active positive electrode material in lithium-ion batteries, having the general formula

F1 wherein $0.15 < v < 0.30$, $v+w=2$, $0.30 \leq x \leq 0.75$, $0.10 \leq y \leq 0.40$, and $0.10 \leq z \leq 0.40$, A being a dopant with $a \leq 0.05$, $x+y+z+a=1$. The precursor comprising Ni, Mn and Co in a molar ratio x:y:z is typically prepared in a mixed form by precipitation reactions, with the following steps: (1) precipitation of mixed hydroxides in a reactor with a flow of NaOH and a flow of mixed metal salt under controlled pH, (2) removal of the precursor suspension and filtration, (3) drying of the filtered wet cake. In step (1) the mixed salt may be a mixed sulfate salt, and the pH typically between 11 and 12. Efficient precursor drying is typically conducted above 100° C. for a certain time to remove most of the moistures. The typical moisture content after drying is below 1 wt %, and can be measured by the well-known Karl Fischer titrimetric method at 250° C. (ASTM D6869). Before drying, the precursor has a pure or ideal hydroxide crystal structure (with space group P-3m1). During drying at a certain temperature, the physically attached moisture evaporates while the precursor also tends to release $H_2O$ from the hydroxide crystal structure, hence forming a precursor with a hydrogen deficiency versus the ideal hydroxide structure (with w<2 in F1), which results in an intimate mixture (at atomic level) of two phases: the "ideal" hydroxide phase, and an "oxidized" hydroxide phase, that can clearly be distinguished in an XRD pattern, as will be shown in the Examples.

In the lithiation process that the precursor will undergo, hydrogen in the hydroxide precursor will be removed in the solid state reaction to get the target Li-Me-$O_2$ transition metal composite oxide. According to the schematic equilibrium reaction here below in F2, one mole pure hydroxide precursor requires 0.25 mole $O_2$ in the reaction and releases half a mole of $CO_2$ and one mole of $H_2O$. The former needs to be obtained from the air flow while the latter two need to be removed. The required amount of gas transportation is actually independent from the lithium source being used, for example $Li_2CO_3$ or LiOH (see F2-F3). From a kinetic point of view, therefore, less gas transportation practically means less air flow, less firing time, a lower firing temperature and probably more material being lithiated in the firing process. This effect may not be identified for a small scale lithiation, but it will be crucial for cathode mass production, where manufacturers are looking for ways to improve throughput and production efficiency. From a material performance point of view, less gas transportation means easier reactions, and enough time to form a perfect layered structure, enabling a better cathode performance. It can be concluded that removing hydrogen from the precipitated hydroxide precursor before the reaction with the lithium precursor is particularly efficient for the formation of the lithiated metal oxide.

F2

F3

In the methods according to the invention, the drying of the hydroxide precursors can be done carefully at well-defined conditions such as temperature, gas atmosphere and time—which are conditions that can interact, for example a higher drying temperature requires less time to obtain the desired product, especially for mass production scale. On the one hand, NMC precursor drying at low temperature under vacuum or protective gas may not be efficient to remove hydrogen, but on the other hand NMC precursor drying at elevated temperature under oxidizing atmosphere will certainly cause phase separation into multiple Ni-, Mn- and Co-oxides or -oxyhydroxides. Phase separation goes against the incentive to obtain a well-mixed precursor at atomic level by the co-precipitation process. Phase separation in the precursor induces the necessity of a lithiation at a higher temperature and for a longer time afterwards, to get a perfect Li-M-$O_2$ layered structure. Phase separation will most probably also create local strain at the interface of the different phases and hence the precipitated crystal structure may collapse. This again causes the need for a longer time and higher temperature lithiation process.

All in all, controlling the precursor drying temperature, atmosphere and drying time may be crucial to get precursors with the smallest amount of hydrogen possible, and without creating phase separation.

Description of Test Conditions in the Examples: X-Ray Diffraction Test

In this invention XRD is applied to characterize the dried precursor compound. The NMC precursor compounds with unique XRD features according to the invention have been found to guarantee the resulting NMC cathode materials having a low irreversible capacity Qirr and a high discharge capacity DQ. X-ray diffraction is carried out using a Rigaku D/MAX 2200 PC diffractometer equipped with a Cu (K-Alpha) target X-ray tube and a diffracted beam monochromator at room temperature in the 15 to 85 2-Theta ($\theta$) degree range. The lattice parameters of the different phases are calculated from the X-ray diffraction patterns using full pattern matching and Rietveld refinement methods. It is known that the structural model of NMC hydroxide precursor (w=2 in F1) is the $\beta$II-Ni(OH)$_2$ structure (space group P-3m1, no. 164)

the structural model of NMC oxyhydroxide precursor (w=1 in F1) is the $\beta$III-NiOOH structure (space group R-3m, no. 166)

the structure of spinel Me$_3$O$_4$ belongs to space group Fd-3mZ, no. 227

Description of Cathode Material Preparation

In this invention, in order to evaluate the electrochemical behavior in a coin cell, cathode materials are prepared from the precursor compounds according to the invention, by using conventional high temperature sintering at representative MP (mass production) scale. Li$_2$CO$_3$ (Chemetall) or LiOH (SQM) is dry mixed with the precursor compound in a certain Li:M molar ratio using a blender for 30 mins. The mixture is reacted at a high temperature (>900° C.) for 10 hr under air, using mass production scale equipment. The Li:M molar blending ratio and sintering temperature are standard, but they differ for precursors with different Ni contents, which will be specified in each individual example. After firing, the sintered cake is crushed, classified and sieved so as to obtain a non-agglomerated powder with a mean particle size D50 similar to that of the precursor.

Description of Test Conditions: Peak Intensity Ratio

The current invention observes that the discharge capacity of the final NMC product is optimized when the NMC precursors have an XRD pattern with twin peaks at 2$\theta$ around 38°, and preferably also at around 33° and 52°, with an intensity ratio between the twin peaks at 38° within a specific range, and the XRD pattern being free of peaks belonging to either one or both of a spinel and an oxyhydroxide compound. The reason of the twin peak formation is discussed in the Explanatory Examples below. For precursors being dried under different conditions, the intensity ratio of the twin peaks at those 2$\theta$ positions changes. Therefore, in the current invention, the peak intensity ratio is calculated and applied as a parameter to characterize the dried NMC precursors. For example, with peak splitting, the XRD pattern from 35.5° to 43° is cut out for peak fitting and peak intensity ratio calculation. The numerical peak fitting is done by using the method of least squares using two sets of Gaussian and Lorentzian functions with the same G/L ratio and with the same full width at half maximum (FWHM). The intensity (the area under the fitted peak) is used to calculate the peak intensity ratio:

$$R = \frac{\text{Area of right peak}}{\text{Area of left peak}}.$$

Description of Test Conditions: Preparation of Coin Cells

Electrodes are prepared as follows: about 27.27 wt. % of active cathode material, 1.52 wt. % polyvinylidene fluoride polymer (KF polymer L #9305, Kureha America Inc.), 1.52 wt. % conductive carbon black (Super P®, Erachem Comilog Inc.) and 69.70 wt. % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent at 120° C. for 3 hr, the cast film is processed through two constantly spinning rolls with a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt. % active materials with an active materials loading weight of about 17 mg (~11 mg/cm²). The electrodes are then put in an argon-filled glove box and assembled within a 2325-type coin cell body. The anode is a lithium foil having a thickness of 500 micrometers (origin: Hosen); the separator is a Tonen 20MMS microporous polyethylene film. The coin cell is filled with a 1M solution of LiPF$_6$ dissolved in a mixture of ethylene carbonate and dimethyl carbonate in a 1:2 volume ratio (origin: Techno Semichem Co.). Each cell is cycled at 25° C. using Toscat-3100 computer-controlled galvanostatic cycling stations (from Toyo) at different rates in the 4.3~3.0V/Li metal window range. The initial charge capacity CQ1 and discharge capacity DQ1 are measured in constant current mode (CC) at 0.1 C rate. The irreversible capacity Qirr is expressed in % as $$Q_{Irr.} = \frac{(CQ1 - DQ1)}{CQ1} \times 100(\%)$$

Description of Test Conditions: Preparation of Full Cells

A slurry is prepared by mixing 1000 g of Li-Me-O$_2$ with NMP, 32.61 g of super P® (conductive carbon black of Timcal), 10.87 g graphite and 434.78 g of 10 wt. % PVDF based binder in a NMP (N-methyl-2-pyrrolidone) solution. The mixture is mixed for 2.5 hr in a planetary mixer. During mixing additional NMP is added. The mixture is transferred to a Disper mixer and mixed for 1.5 hr under further NMP addition. A typical total amount of NMP used is 585.28 g. The final solid content in the slurry is about 65 wt %. The slurry is transferred to a coating line, where it is coated on both sides of a current collector resulting in an electrode having a smooth surface and a loading of 13.4 mg/cm². The electrodes are compacted by a roll press to achieve an electrode density of about 3.25 g/cm³. In addition, the slurry viscosity is measured by Brookfield viscometer. The typical slurry viscosity is about 2000 to 4000 cps. Low slurry viscosity is always preferred to guarantee slurry coating quality.

To prepare pouch cell type full cells, the positive electrode (cathode) is assembled with a negative electrode (anode) which is typically a graphite type carbon, and a porous electrically insulating membrane (separator). The full cell is prepared by the following major steps: (1) electrode slitting, (2) tab attaching, (3) electrode drying, (4) jellyroll winding, and (5) packaging:

(1) electrode slitting: after coating the electrode active material on the electrode, it can be slit by a slitting machine. The width and length of the electrode are determined according to the battery application;
(2) tab attaching: there are two kinds of tabs. Aluminum tabs are attached to the positive electrode (cathode), and copper tabs are attached to the negative electrode (anode);
(3) electrode drying: the prepared cathode and anode are dried at 85° C. to 120° C. for 8 hr in a vacuum oven;
(4) jellyroll winding: after drying the electrode a jellyroll is made using a winding machine. A jellyroll consists of at least a negative electrode (anode) a porous electrically insulating membrane (separator) and a positive electrode (cathode);
(5) packaging: the prepared jellyroll is incorporated in a 360 mAh cell with an aluminum laminate film package, resulting in a pouch cell. The jellyroll is subsequently impregnated with the electrolyte. The quantity of electrolyte is calculated in accordance with the porosity and dimensions of the positive and negative electrodes and the porous separator. Finally, the packaged full cell is sealed by a sealing machine. The packaged full cell includes a gas room aside, which is to collect gas during precharging.

(6) precharge and degassing: the prepared cells are precharged at 0.25 C rate with constant current (CC) mode to 15% of the expected cell capacity. 1 C rate corresponds to the current which discharges a charged cell within 1 hr. (it follows that e.g. 3 C is 3 times faster discharged, 0.25 C is 4 times slower). The cells are aged for 48 hours and then the cell gas room part is removed;
(7) formation: the cell is then charged at 0.25 C rate with constant current-constant voltage (CCCV) mode to 4.2V (cut-off current 1/120C). After resting for 10 mins, it is discharged at 0.5 C rate with CC mode to 2.7V. After resting for 10 mins, it is charged at 0.5 C rate with CCCV mode to 4.2V (cut-off current 1/20C). The cell discharge capacity during this formation cycle is recorded and used for full-cell specific capacity calculations;
(8) aging and final charge: the cell after formation is aged at 25° C. for 7 days for an Open Circuit Voltage (OCV) check. The cell is then discharged first at 0.5 C rate with CC mode for recovery capacity check. After resting for 10 mins, it is charged at 1 C rate with CCCV mode to 4.2V (cut-off current 1/20C). After resting for 10 mins, it is discharged at 0.2 C rate with CC mode to 2.7V. After resting for 10 mins, it is finally charged at 1 C rate with CCCV mode to 50% of the cell capacity. The cell is ready for all kinds of full-cell testing.

Description of Test Conditions: Full Cell Temperature Test at −20° C.

The cell after final charge (8) is used for a temperature test. Prior to the test, the cell is discharged and charged between 2.7V and 4.2V for two cycles. Discharging is done at 0.5 C rate with CC mode to 2.7V low cut-off voltage, while charging is done at 1 C rate with CCCV mode to 4.2V upper cut-off voltage (cut-off current 1/20C). The cell at charged state is put into a chamber at −20° C. for 2 hours, followed by a discharge at 0.5 C rate with CC mode to 2.7V. The discharge capacity is recorded as "cell retention capacity at −20° C.".

Description of Test Conditions: Full Cell Hot Box Test

The cell after final charge (8) is used for a hot box test. The cell is first discharged at 0.5 C rate with CC mode to 2.7V and then fully charged at 1 C rate with CCCV mode to 4.2V. The fully charged cell is put into a hot box chamber, which is heated up at about 0.5° C./min to 180° C. Both the temperature of the chamber and the voltage of the cell are monitored simultaneously. When the cell fails, its voltage drops immediately. The hot box chamber temperature at failure is recorded.

Description of Test Conditions: Full-Cell Cycling Test

The cell after the formation cycle (7) is used for a full-cell cycling test. For each cycle, discharging is conducted at 1 C rate with CC mode to 2.7V, while charging is conducted at 1 C rate with CCCV mode to 4.2V (cut-off current 1/20C). To avoid the influence of self-heating of the cell on the cell temperature during charge and discharge, a 10 mins relaxation time is applied after each charge and discharge step. The retention capacity of each cycle is recorded. For every one hundred cycles, the discharge direct current resistance (DCR) is checked. The cell is charged at 1 C rate with CCCV mode to 4.2V, where a 10 second discharge at 3 C rate is applied. The difference in voltage during pulse discharge and the current of 3 C rate are used to calculate the discharge DCR at 100% state of charge (SOC).

The following examples illustrate the present invention in more detail.

Explanatory Examples

EEX1~EEX6

A wet cake of a nickel-manganese-cobalt-hydroxide precursor with molar ratio 60:20:20 (NMC622) is collected from a mass production precipitation. By "wet cake" we refer to precipitated precursor after washing and filtering but without drying. The wet cake is split into pyroflam trays of about 10 kg per batch and dried in the lab under different defined conditions, which include drying atmosphere, cooling atmosphere, drying temperature and drying time as shown in Table 1A. The purpose is to get precursors with different XRD characteristics.

Figure 1:
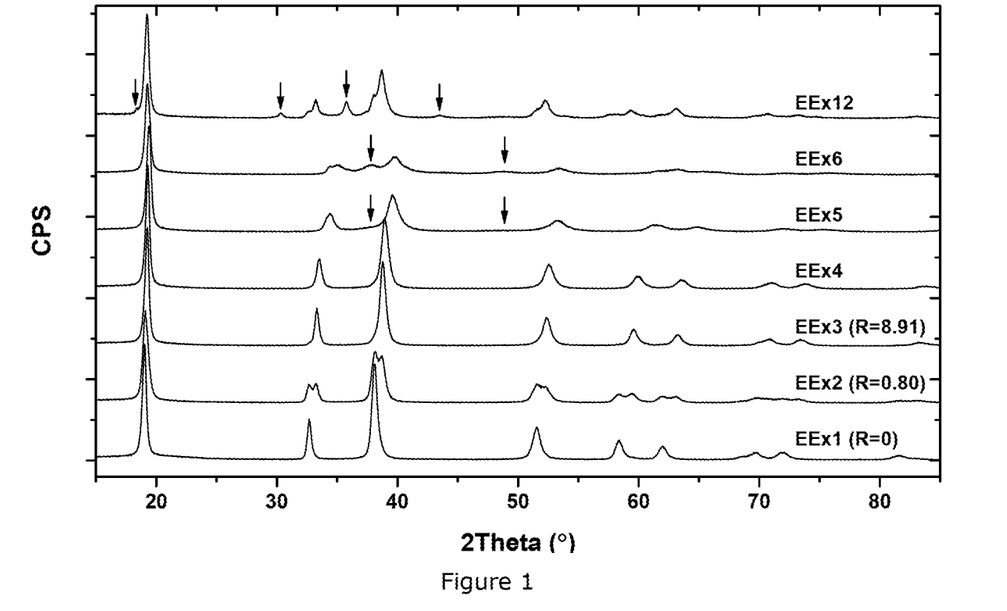
FIG. 1: XRD patterns of selected Explanatory Examples.

As shown in Table 1B, EEX1, dried at 150° C. and cooled under $N_2$, has an ideal βII-Me(OH)$_2$ hydroxide crystal structure with space group P-3m1. The length of the a-axis is 3.1596 Å as determined by XRD refinement. According to the Inorganic Crystal Structure Database (ICSD), the length of the a-axis for Ni(OH)$_2$ (ICSD-13684), Mn(OH)$_2$ (ICSD-13410) and Co(OH)$_2$ (ICSD-58655) with P-3m1 structure is 3.130 Å, 3.322 Å and 3.186 Å, respectively. Calculated by using these values, the weighted average length of a NMC622 precursor is 3.180 Å, very close to what we have in EEX1. EEX4, dried at 150° C. under vacuum and cooled under dry air (i.e. with an absolute moisture content <1 g/m$^3$), also shows an XRD pattern belonging to a typical βII-Me(OH)$_2$ hydroxide crystal structure. However, all the XRD peaks move to a higher 2θ angle compared to those of EEX1, as shown in FIG. 1. The length of the a-axis is 3.0823 Å, much shorter than that of EEX1. We call it an oxidized βII-Me(OH)$_2$, oxidized corresponding to hydrogen deficient or hydrogen depleted. The XRD pattern of EEX2, dried at 135° C. and cooled under vacuum, shows twin or split peaks at 2θ of about 33°, 38° and 52°. The positions of the split peaks fit very well with those characteristic peaks of EEX1 and EEX4, respectively, clearly indicating that EEX2 contains both ideal βII-Me(OH)$_2$ and oxidized βII-Me(OH)$_2$ structures. On the XRD pattern, the co-existence of both structures is best reflected by these twin peaks at 2θ of about 33°, 38° and 52°, the left peaks corresponding to the ideal β(II)-Me(OH)$_2$ structure, while the right ones corresponding to the oxidized β(II)-Me(OH)$_2$ structure. The length of the a-axis for both structures is obtained by Rietveld refinement.

EEX3, similar with EEX2, also contains both the ideal βII-Me(OH)$_2$ and oxidized βII-Me(OH)$_2$ structures, but with different weight percentages. EEX5, dried at 150° C. in air and cooled in air has a majority of oxidized βII-Me(OH)$_2$ structure and a minor βIII-MeOOH defect. The latter has characteristic peaks at 38° and 48°. EEX6, dried at a higher T in air than EEX5, shows an even more pronounced βIII-MeOOH defect and a less pronounced βII-Me(OH)$_2$ structure. In FIG. 1, the arrows in EEX5 and EEX6 indicate the formation of β(III)-MeOOH defects, which are better illustrated in FIG. 8 where the same XRD patterns are plotted in Ln(CPS) scale. To summarize, some main characteristic structures are captured during precursor drying in the Explanatory Examples EEX1~6.

EEX7~12

A similar set of experiments is repeated on a nickel-manganese-cobalt-hydroxide precursor with molar ratio 50:30:20 (NMC532) in EEX7, EEX8, EEX9 and EEX10, as shown in Table 1A&B. In general, NMC532 precursors show exactly the same characteristic structures at different drying temperatures compared to their NMC622 counterparts, being dried under the same conditions. All the details are shown in Table 1A&B.

Figure 8:
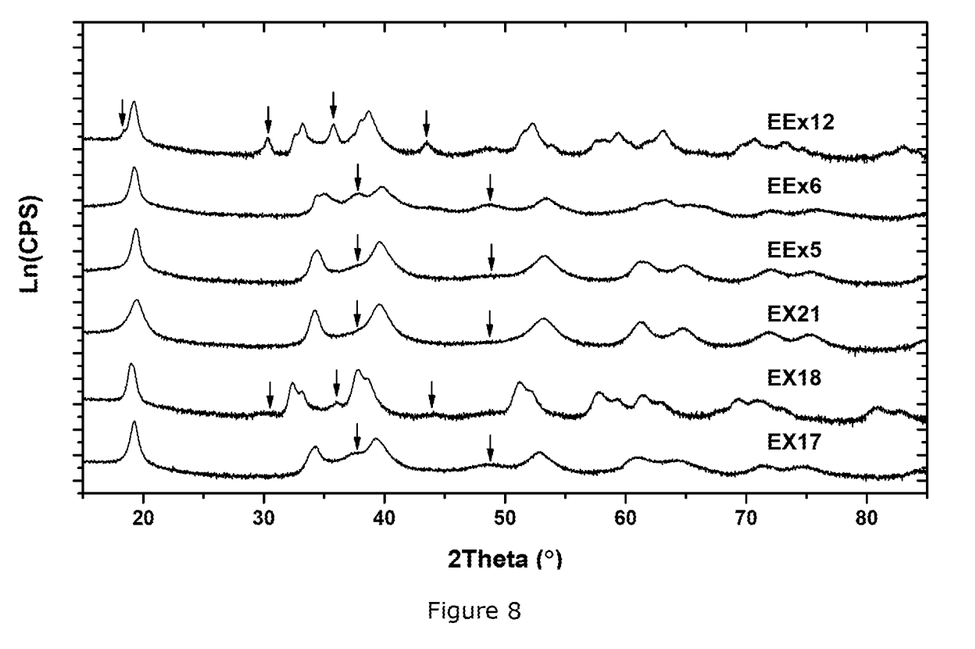
FIG. 8: XRD patterns plotted in Ln(CPS) scale of selected Examples.

In addition, two nickel-manganese-cobalt-hydroxide precursors with molar ratio 34:33:33 (NMC333) are dried and cooled under vacuum with EEX11 at 150° C. and EEX12 at 200° C. The XRD patterns show that a spinel Me$_3$O$_4$ defect tends to be formed when NMC333 precursor is dried under vacuum between 150° C. and 200° C. In FIGS. 1 and 8, the arrows in EEx12 point the XRD peaks for the spinel Me$_3$O$_4$.

For all the explanatory examples, the average length of a-axis is calculated from the weighted mean of the a-axes of both ideal βII-Me(OH)$_2$ and oxidized βII-Me(OH)$_2$ structures, but not from minor defects such as Me$_3$O$_4$, and βIII-MeOOH.

EXAMPLES

EX1~EX17

Figure 2:
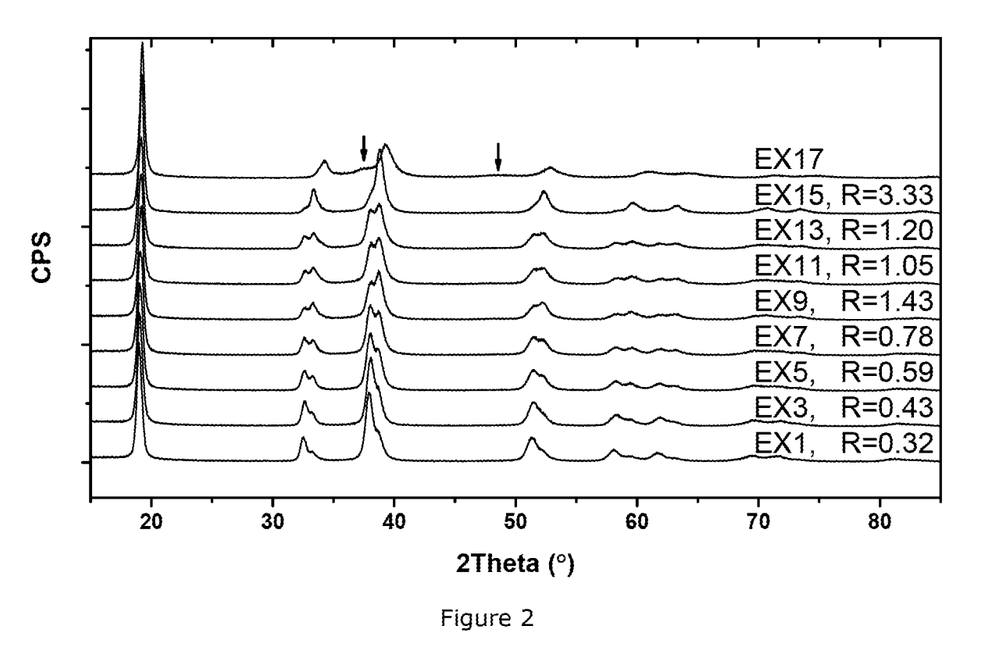
FIG. 2: XRD patterns of NMC532 precursors in the order of the peak intensity ratio (R)

A series of NMC532 precursors are co-precipitated at a mass production (MP) site for NMC532 cathode production. The NMC532 precursors are continuously removed from the reactor tank, and then washed and filtered, and a wet cake is obtained. Afterwards, they are dried batch by batch at a scale of several tons in a big tumble dryer under vacuum for 10 hrs. and afterwards cooled under vacuum as well. The shell of the tumble dryer is heated by water steam with a target drying temperature of 135° C. All precursors are scanned by XRD at a 2θ range from 15° to 85°. The XRD pattern is Rietveld refined by commercial software Topas. FIG. 2 shows that the majority of the precursors contains twin peak at 2θ around 33°, 38° and 52°, but with different peak intensity ratios. It has been determined that the lot-to-lot difference is due to the difference in quantity of hydrogen removed by the thermal decomposition of the already dried cake. The mass production tumble drying equipment efficiency can be fine-tuned by setting the target drying temperature as a function of the quantity of material to be dried, the tumble drying time and the water content of the precipitated wet cake. For Ex 1 to Ex 6, the quantity of mole H per mole pure hydroxide precursor that was removed was less than 0.15 mole/mole, for Ex 17, Ex 18 and Ex 21 it was more than 0.30 mole/mole.

Ex1~Ex16 are all with the combination of ideal β(II)-Me(OH)$_2$ and oxidized β(II)-Me(OH)$_2$ structure (see Table 2A). Both structures belong to the same space group with slightly different lattice parameters, i.e. the length of a, c-axes. As shown in Table 2A, there is a tendency for the length of the a-axes for ideal β(II)-Me(OH)$_2$ structure to decrease with its decreasing weight fraction, while that for the oxidized β(II)-Me(OH)$_2$ structure decreases with its increasing weight fraction. This continuous change of a-axes indicates an intergrowth process of oxidized β(II)-Me(OH)$_2$ within the ideal β(II)-Me(OH)$_2$ during the drying of the NMC532 precursor. Ex17 mainly contains the oxidized β(II)-Me(OH)$_2$ structure, no peaks for ideal β(II)-Me(OH)$_2$ structure. Instead, a small amount of β(III)-MeOOH is identified, indicating a formation of an oxyhydroxide phase, corresponding to the phase in EEX5 and EEX6.

It is to be noted that the intergrowth of oxidized β(II)-Me(OH)$_2$ structure inside the ideal β(II)-Me(OH)$_2$ is in principle coherent because both belong to the same space group, and thus it cannot be harmful for the crystal structure. However, the formation of the cubic oxyhydroxide β(III)-MeOOH phase, due to its different lattice array, creates a lattice misfit to the oxidized β(II)-Me(OH)$_2$ structure, and hence a high local strain. At the applied drying temperature, the presence of this strain makes it very difficult to maintain the crystallite size during the gradual phase transformation from hexagonal to cubic phase. This could be proved by the reducing peak intensity of all characteristic peaks in EEX5 and EEX6. The bad crystallinity of these precursors could lead to a less perfect lattice arrangement after lithiation, which obviously is not preferred.

EX1~EX16 all contains twin splitting of the 100 peak) (2θ~33°, 101 peak) (2θ~38°), 102 peak (2θ~52°), the peaks at 38° having the highest intensity and clearest splitting. At each of those positions, the peaks with the slightly higher 2θ angle (right peaks) belong to the oxidized β(II)-Me(OH)$_2$ while the peaks with slightly lower angles (left peaks) belong to the ideal β(II)-Me(OH)$_2$. In the current invention, the XRD pattern from 35.5° to 43° is extracted for peak intensity ratio calculations using the method described before. The peak at slightly lower 2θ angle is considered as "left peak" and the peak at slightly higher 2θ angle as "right peak". The calculated peak intensity ratio (R) is listed in Table 2B. For EX17, its peak intensity ratio is considered close to infinity due to the absence of ideal β(II)-Me(OH)$_2$ structure. In FIG. 2, arrows indicate the formation of β(III)-MeOOH defects in EX17 precursor, which are better illustrated in FIG. 8 where the same XRD patterns are plotted in Ln(CPS) scale. EX1~EX16 are actually arranged with (R) from small to big.

Figure 3:
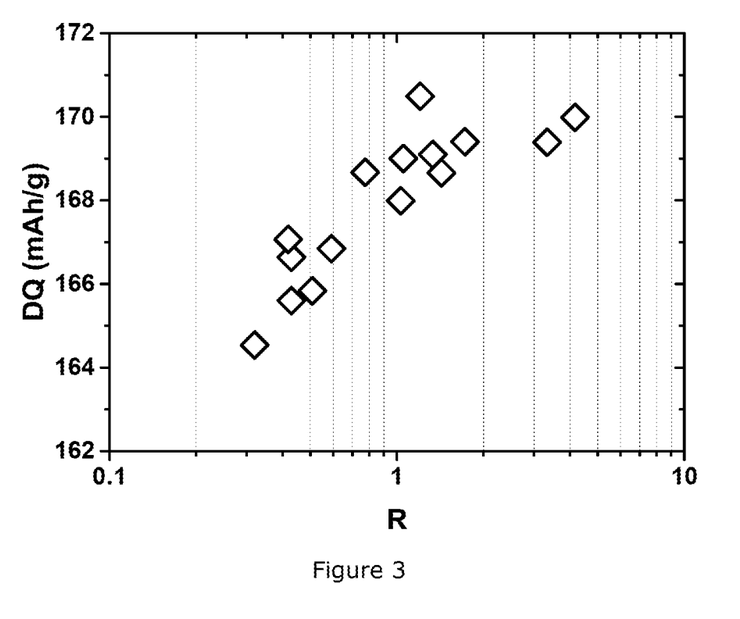
FIG. 3: Coin cell 1$^{st}$ cycle 0.1 C discharge capacity for NMC532 products against the peak intensity ratio (R) of the corresponding NMC532 precursors.

All the NMC532 precursors are lithiated by using a conventional high temperature sintering process. Li$_2$CO$_3$ (Chemetall) is dry mixed with the precursor compound in a Li:M molar ratio around 1.02 by using a blender for 30 mins. The mixture is reacted at 925° C. in trays for 10 hrs under air using mass production scale equipment. After firing, the sintered cake is crushed, classified and sieved so as to obtain a non-agglomerated powder with a mean particle size D50 similar to that of the precursor, i.e. about 11 μm. For all NMC532 made from EX1~EX16, the 1$^{st}$ cycle 0.1 C coin cell discharge capacity increases with peak intensity ratio first and then becomes more or less stabilized, as shown in Table 2B and FIG. 3.

Figure 4:
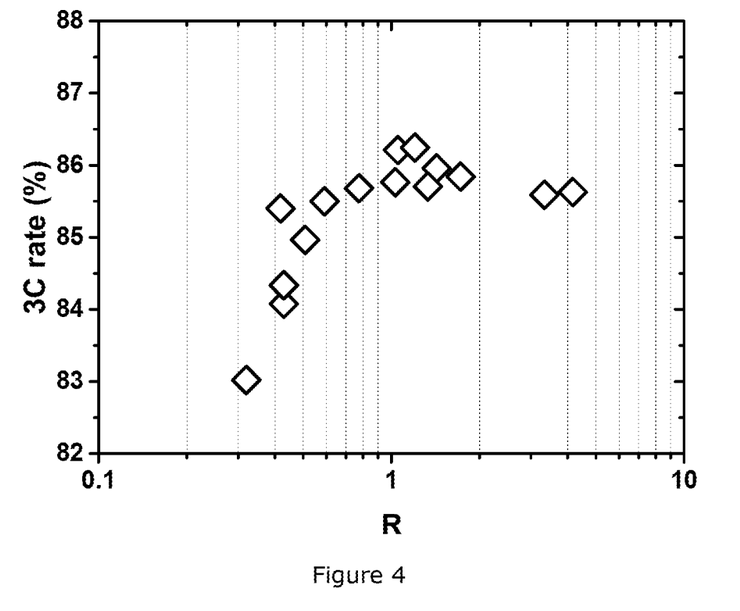
FIG. 4: Coin cell rate performance (DQ at 3 C rate over DQ at 0.1 C rate) for NMC532 products against the peak intensity ratio (R) of the corresponding NMC532 precursors.

Since the charge capacities are the same from EX1~EX16, the difference in DQ mainly comes from the difference in Qirr during the first cycle. In addition, the 3 C rate performance also increases with peak intensity ratio and then becomes more or less stabilized, as seen in FIG. 4. The 3 C rate percentage is equal to the discharge capacity at 3 C rate normalized over the discharge capacity at 0.1 C. The biggest difference in discharge capacity at 3 C is as high as 8 mAh/g in the current study. For EX17 having only single peaks in the XRD pattern, it has a much higher loss of capacity during the first cycle, lower DQ and lower 3 C rate performance, which is not supported by its high peak intensity ratio (near infinity). It rather indicates that the formation of the β(III)-MeOOH causes a less perfect crystal structure after lithiation, and this deteriorates the cathode performance. Therefore, it is believed that precursor structure and defect configuration are really critical for the reaction kinetics, such as the time needed to achieve a gas equilibrium, the time needed to get a perfect crystal structure and so on. To conclude, NMC532 precursors with the characteristic twin peak structure at around 38° and with a peak intensity ratio R>0.7 (but absent being peaks corresponding to either one or both of a spinel and an oxyhydroxide compound) according to the invention are preferred.
EX18~EX19

Figure 5:
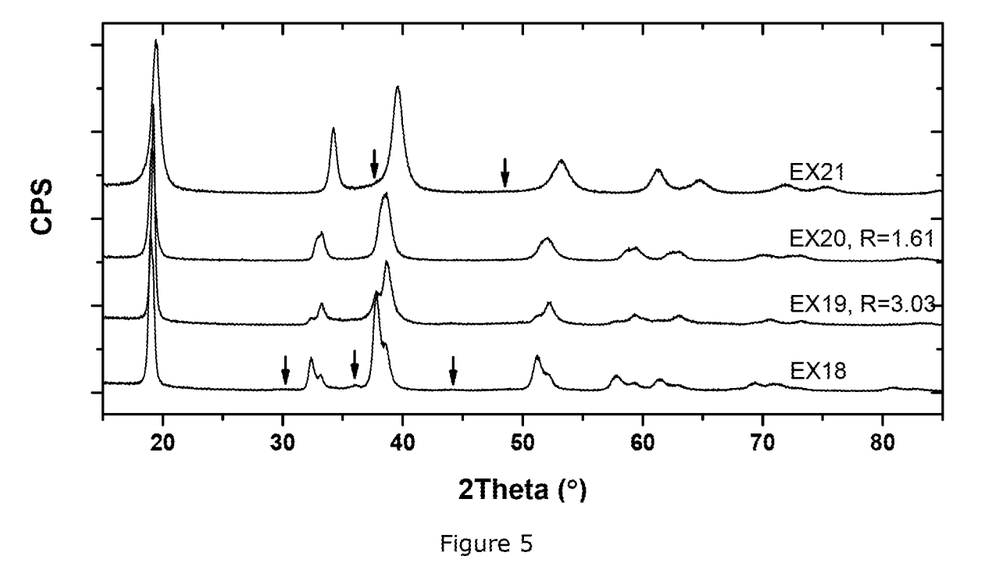
FIG. 5: XRD patterns of NMC111 precursors (Ex20, Ex21) and NMC622 precursors (Ex22, Ex23)

By using the same production line as NMC532 precursors, NMC111 precursors are co-precipitated at MP scale for NMC111 cathode production. After being washed and filtered, the NMC111 precursor is also dried batch by batch at a scale of several tons in a big tumble dryer under vacuum for 10 hrs., and afterwards cooled under vacuum. The shell of the tumble dryer is heated by water steam with a target drying temperature of 135° C. The precursors are scanned by XRD at a 2θ range from 15° to 85°, the results are shown in Table 2A. Ex18 shows both the ideal β(II)-Me(OH)$_2$ structure and the oxidized β(II)-Me(OH)$_2$ structure. However it contains spinel Me$_3$O$_4$ impurities, as shown in FIGS. 5 & 8, where the arrows highlight the spinel impurity. Ex19 contains a big fraction of the oxidized β(II)-Me(OH)$_2$ structure and a small fraction of the ideal β(II)-Me(OH)$_2$, but without any impurities. The calculated peak intensity ratio is about 3. This variation between two NMC111 precursors is believed to be due to the same reasons as for the NMC532 precursors.

Both NMC111 precursors are lithiated in a conventional high temperature sintering process. Li$_2$CO$_3$ (Chemetall) is dry mixed with the precursor compound in a Li:M molar ratio around 1.11 by using a blender for 30 mins. The mixture is reacted at 980° C. for 10 hr under air, using a mass production scale equipment. After firing, the sintered cake is crushed, classified and sieved so as to obtain a non-agglomerated powder with a mean particle size D50 similar to that of the precursor, i.e. about 10 μm. As shown in Table 2B, the NMC111 cathode from Ex19 has a higher 1st cycle DQ, higher rate performance and lower Qirr compared to that from Ex18. It is partially attributed to its higher peak intensity ratio. Besides, the spinel impurity is also believed to be a reason for the low capacity and rate performance of EX18. To conclude, an NMC111 precursor with characteristic twin peak structure and with peak intensity ratio R>0.7 is preferred, i.e. the same conclusion as for the NMC532 precursors.
EX20~EX21

Ex20 is an NMC622 precursor co-precipitated, filtered, washed and dried under the same conditions as the NMC111 and NMC532 precursors. It contains both ideal and oxidized β(II)-Me(OH)$_2$ structures with peak intensity of 1.61, as shown in FIG. 5. Ex21 is a commercial NMC622 precursor bought from an external supplier. It has very similar physicochemical properties as Ex20, except that it has mainly an oxidized β(II)-Me(OH)$_2$ structure (only single peaks in the XRD pattern) and a small fraction of β(III)-MeOOH defect, comparable to EX19 in NMC532 (see Table 2A). In FIGS. 5 & 8, the arrows in Ex21 indicate the β(III)-MeOOH defect. All the NMC622 precursors are lithiated by using conventional high temperature sintering process. LiOH (Chemetall) is dry mixed with the precursor compound in a Li:M molar ratio around 1.02 by using a blender for 30 mins. The mixture is reacted at 880° C. for 10 hr under air, using a mass production scale equipment. After firing, the sintered cake is crushed, classified and sieved so as to obtain a non-agglomerated powder with a mean particle size D50 similar to that of the precursor, i.e. about 12 μm. As shown in Table 2B, the NMC622 cathode made from Ex20 has an excellent coin cell 1st cycle DQ and good rate performance, while the one made from Ex21 has a 2.7 mAh/g lower DQ and a 4% lower rate performance at 3 C rate. This amounts to more than 9 mAh/g loss in discharge capacity at 3 C rate, which is huge. To conclude, an NMC622 precursor with the characteristic twin peak structure and with a peak intensity ratio R>0.7 is preferred, as already concluded for the NMC111 and NMC532 precursors.
EX2-I, EX10-I, EX2-II, EX10-II The precursors of EX2 and EX10 have peak intensity ratios of 0.43 and 1.72 respectively. To demonstrate the impact of the precursor on the cathode performance, from these two precursors, four more cathodes are prepared in a mass production line using the same lithiation conditions as described above in EX1~EX17, except that:

EX2-I and EX10-I are lithiated in a tray with a blend loading of 3 kg;

EX2-II and EX10-II are lithiated in a tray with a blend loading of 7 kg. At a blend loading of 3 kg, EX10-I, compared to EX2-I, has a higher coin cell 0.1 C DQ with a similar CQ, lower Qirr, and higher 3 C rate performance, as listed in Table 3A.

The cathode active materials are also incorporated in full cells as described before. Table 3B shows the slurry viscosity, at a half hour after the full cell slurry preparation. The cathode made from EX10-I clearly has a lower slurry viscosity, which makes it easier for cathode coating onto the Al foil current collector. Besides, the full cell specific capacity and 3 C rate performance is consistent with the coin cell data. When tested at −20° C., the full cell made from EX10-I also shows a slightly higher capacity retention, compared to that made from EX2-I. As for the hot box testing, the voltage of EX10-I is maintained up to a temperature higher than that of EX2-I, which indicates better safety.

Figure 6:
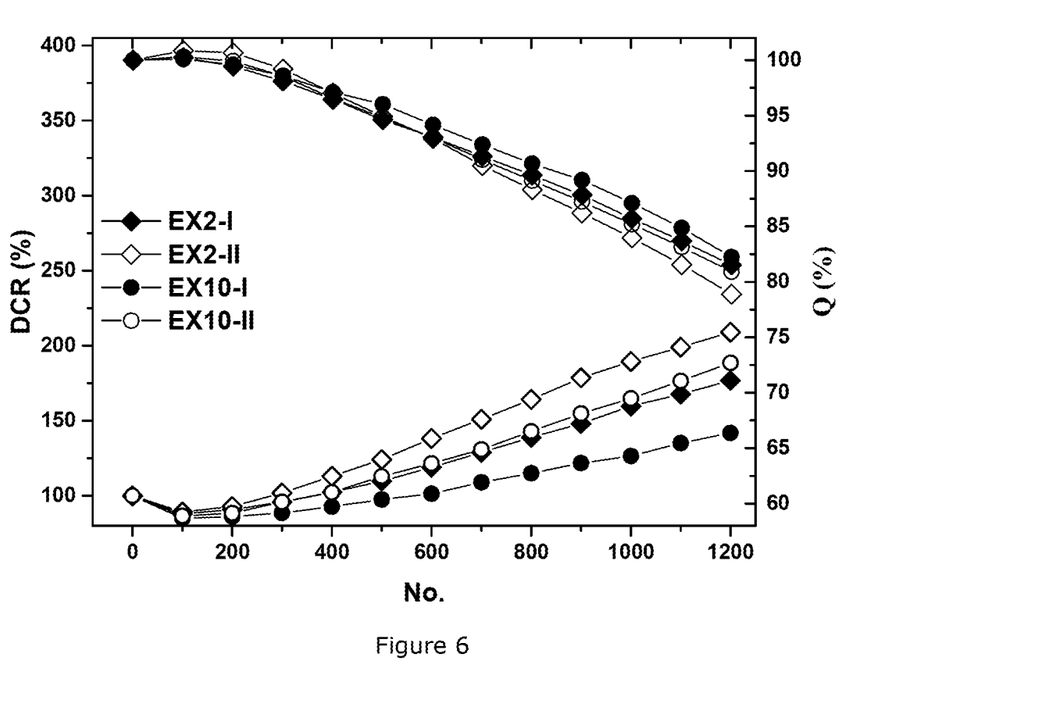
FIG. 6: 25° C. cycle life (top lines and right axis) and DCR growth (bottom lines and left axis) during cycling for EX2-I, EX2-II, EX10-I and EX10-II.
Figure 7:
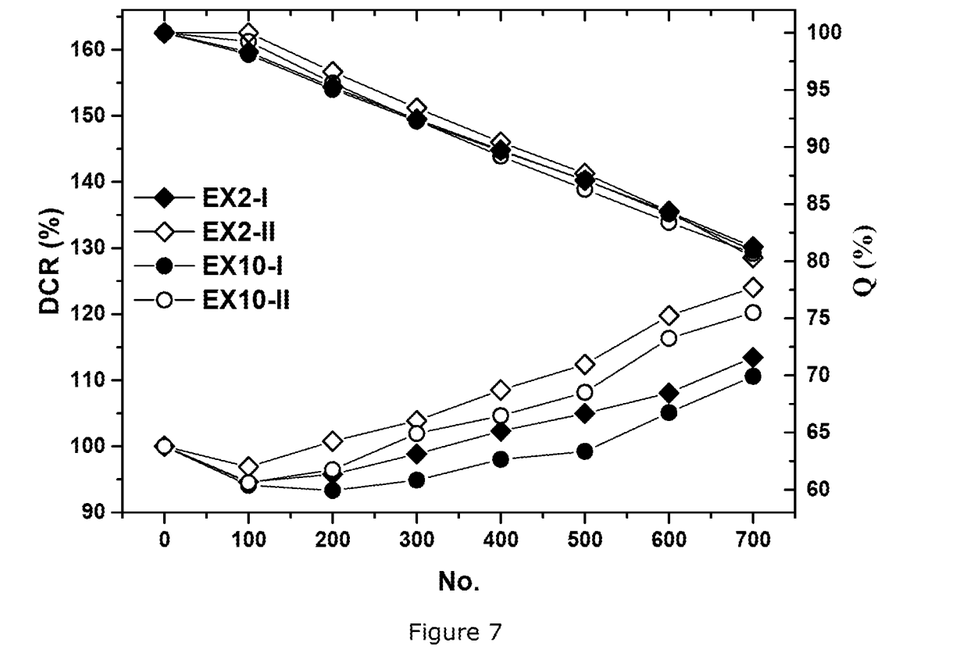
FIG. 7: 45° C. cycle life (top lines and right axis) and DCR growth (bottom line and left axis) during cycling for EX2-I, EX2-II, EX10-I and EX10-II.

FIG. 6 shows the full cell cycle life tested at 25° C., where EX10-I and EX2-I basically have the same capacity fading during cycling. However, the former clearly has less DCR increase compared to the latter. FIG. 7 shows the full cell cycle life data tested at 45° C. Consistently, EX10-I has less DCR increase compared to EX2-I, despite the fact that their cycling stability at 45° C. are the same.

For the blend loading of 7 kg, coin cell testing data and full cell testing data confirm that cathodes made from EX10-II have a benefit over those made from EX2-II, as shown in Table 3A&B and FIGS. 6 & 7. For cathode mass production, a high temperature firing using trays, and a low blend load factor typically ensure a complete solid state reaction and a better cathode crystal structure and hence better cathode performance. So it is normal that EX2-II fired at 7 kg blend loading has worse performance compared to EX2-I at 3 kg blend loading, as is also the case for EX10-II against EX10-I. However, if we compare the performance degradation in EX2-II versus EX2-I to the performance degradation of EX10-II versus EX10-I (the latter being smaller than the former), it is shown that this performance degradation occurring at a high blend loading can be reduced if a precursor compound with high(er) peak intensity ratio is applied (R being smaller for EX2 than for EX10).

TABLE 1A

Explanatory examples on 10~12 μm precursor being dried under defined conditions

| No | Precursor Ni/Mn/Co | Drying atmosphere | Cooling atmosphere | Drying T (° C.) | Drying time (hrs.) |
|---|---|---|---|---|---|
| EEX1 | 60/20/20 | $N_2$ | $N_2$ | 150 | 24 |
| EEX2 | 60/20/20 | Vacuum | Vacuum | 135 | 24 |
| EEX3 | 60/20/20 | Vacuum | Vacuum | 150 | 24 |
| EEX4 | 60/20/20 | Vacuum | Dry air | 150 | 24 |
| EEX5 | 60/20/20 | Dry air | Dry air | 150 | 24 |
| EEX6 | 60/20/20 | Dry air | Dry air | 200 | 24 |
| EEX7 | 50/30/20 | $N_2$ | $N_2$ | 150 | 24 |
| EEX8 | 50/30/20 | Vacuum | Vacuum | 150 | 24 |
| EEX9 | 50/30/20 | Vacuum | Dry air | 150 | 24 |
| EEX10 | 50/30/20 | Dry air | Dry air | 150 | 24 |
| EEX11 | 34/33/33 | Vacuum | Vacuum | 150 | 24 |
| EEX12 | 34/33/33 | Vacuum | Vacuum | 200 | 24 |

TABLE 1B

Explanatory examples on 10~12 μm precursor being dried under defined conditions -ctd.

| N° | Ideal β(II)-Me(OH)$_2$ | | | Oxidized β(II)-Me(OH)$_2$ | | | β(III)-MeOOH | Me$_3$O$_4$ | Average a-axis (Å) | Peak intensity ratio R |
|---|---|---|---|---|---|---|---|---|---|---|
|  | Wt % | a(Å) | c(Å) | Wt % | a(Å) | c(Å) | Yes or no? | Yes or no? |  |  |
| EEX1 | 100 | 3.1596 | 4.6533 |  |  |  | No | No | 3.160 | 0.00 |
| EEX2 | 46.6 | 3.1624 | 4.6561 | 53.4 | 3.1117 | 4.5960 | No | No | 3.135 | 0.80 |
| EEX3 | 9.1 | 3.1583 | 4.6241 | 90.9 | 3.0991 | 4.5878 | No | No | 3.104 | 8.91 |
| EEX4 |  |  |  | 100 | 3.0823 | 4.5832 | No | No | 3.082 | / |
| EEX5 |  |  |  | 100 | 3.0145 | 4.5677 | Yes | No | 3.015 | / |
| EEX6 |  |  |  | 100 | 2.9823 | 4.5744 | Yes | No | 2.982 | / |
| EEX7 | 100 | 3.1846 | 4.6666 |  |  |  | No | No | 3.185 | 0.00 |
| EEX8 | 73.5 | 3.1845 | 4.6632 | 26.5 | 3.1520 | 4.6607 | No | No | 3.176 | 0.31 |
| EEX9 | 47.9 | 3.1737 | 4.6742 | 52.1 | 3.0633 | 4.6103 | No | No | 3.116 | 1.10 |
| EEX10 |  |  |  | 100 | 3.0000 | 4.5571 | Yes | No | 3.000 | / |
| EEX11 | 65.0 | 3.1954 | 4.6775 | 35.0 | 3.1232 | 4.6265 | No | No | 3.170 |  |
| EEX12 | 18.9 | 3.1642 | 4.6682 | 65.4 | 3.1069 | 4.6019 | No | Yes | 3.120 | / |

TABLE 2A

Example NMC precursors for Li-Me-O$_2$ cathode mass production

| No | Precursor Ni/Mn/Co | Ideal β(II)-Me(OH)$_2$ | | | Oxidized β(II)-Me(OH)$_2$ | | |
|---|---|---|---|---|---|---|---|
|  |  | Wt % | a (Å) | c(Å) | Wt % | a(Å) | c(Å) |
| EX1 | 50/30/20 | 62.6 | 3.1759 | 4.6725 | 37.4 | 3.1041 | 4.6405 |
| EX2 | 50/30/20 | 56.9 | 3.1723 | 4.6701 | 43.1 | 3.1049 | 4.6341 |
| EX3 | 50/30/20 | 55.3 | 3.1676 | 4.6691 | 44.7 | 3.1100 | 4.6332 |
| EX4 | 50/30/20 | 50.4 | 3.1737 | 4.6729 | 49.6 | 3.1030 | 4.6341 |
| EX5 | 50/30/20 | 48.4 | 3.1716 | 4.6729 | 51.6 | 3.1066 | 4.6292 |

TABLE 2A-continued

Example NMC precursors for Li-Me-O$_2$ cathode mass production

| Precursor | | Ideal β(II)-Me(OH)$_2$ | | | Oxidized β(II)-Me(OH)$_2$ | | |
|---|---|---|---|---|---|---|---|
| No | Ni/Mn/Co | Wt % | a (Å) | c(Å) | Wt % | a(Å) | c(Å) |
| EX6 | 50/30/20 | 48.2 | 3.1676 | 4.6648 | 51.8 | 3.1054 | 4.6351 |
| EX7 | 50/30/20 | 41.8 | 3.1700 | 4.6733 | 58.2 | 3.1020 | 4.6279 |
| EX8 | 50/30/20 | 37.7 | 3.1712 | 4.6790 | 62.3 | 3.1042 | 4.6253 |
| EX9 | 50/30/20 | 36.4 | 3.1661 | 4.6786 | 63.6 | 3.0983 | 4.6231 |
| EX10 | 50/30/20 | 31.5 | 3.1678 | 4.6836 | 68.5 | 3.1020 | 4.6220 |
| EX11 | 50/30/20 | 35.4 | 3.1652 | 4.6763 | 64.6 | 3.0964 | 4.6268 |
| EX12 | 50/30/20 | 35.5 | 3.1642 | 4.6788 | 64.5 | 3.0968 | 4.6269 |
| EX13 | 50/30/20 | 35.9 | 3.1670 | 4.6783 | 64.1 | 3.0940 | 4.6285 |
| EX14 | 50/30/20 | 35.5 | 3.1613 | 4.6882 | 64.5 | 3.0886 | 4.6238 |
| EX15 | 50/30/20 | 17.6 | 3.1590 | 4.6940 | 82.4 | 3.0949 | 4.6133 |
| EX16 | 50/30/20 | 16.2 | 3.1570 | 4.6039 | 83.8 | 3.0857 | 4.6185 |
| EX17 | 50/30/20 | 0.0 | | | 100.0 | 3.0354 | 4.6069 |
| EX18 | 34/33/33 | 59.2 | 3.1892 | 4.6751 | 40.8 | 3.1195 | 4.6349 |
| EX19 | 34/33/33 | 18.4 | 3.1844 | 4.6841 | 81.6 | 3.1027 | 4.6073 |
| EX20 | 60/20/20 | 42.1 | 3.1410 | 4.6649 | 57.9 | 3.1080 | 4.6146 |
| EX21 | 60/20/20 | 0.0 | | | 100 | 3.0267 | 4.5705 |

TABLE 2B

Example NMC precursors for Li-Me-O$_2$ cathode mass production -ctd.

| | β(III)- | | Avg. | | | Coin cell performance | | | |
|---|---|---|---|---|---|---|---|---|---|
| N° | MeOOH Yes/no? | Me$_3$O$_4$ Yes/no? | a-axis (Å) | R | D50 (μm) | CQ (mAh/g) | DQ (mAh/g) | Qirr (%) | 3 C rate (%) |
| EX1 | No | No | 3.149 | 0.32 | 11.2 | 190.4 | 164.5 | 13.6 | 83.0 |
| EX2 | No | No | 3.143 | 0.43 | 11.0 | 190.6 | 165.6 | 13.1 | 84.1 |
| EX3 | No | No | 3.142 | 0.43 | 11.6 | 190.9 | 166.6 | 12.7 | 84.3 |
| EX4 | No | No | 3.139 | 0.51 | 11.2 | 190.8 | 165.8 | 13.1 | 85.0 |
| EX5 | No | No | 3.138 | 0.59 | 11.8 | 189.7 | 166.8 | 12.1 | 85.5 |
| EX6 | No | No | 3.135 | 0.42 | 11.3 | 191.5 | 167.1 | 12.8 | 85.4 |
| EX7 | No | No | 3.130 | 0.78 | 10.6 | 190.9 | 168.7 | 11.6 | 85.7 |
| EX8 | No | No | 3.129 | 1.03 | 11.0 | 190.8 | 168.0 | 11.9 | 85.8 |
| EX9 | No | No | 3.123 | 1.43 | 10.7 | 190.6 | 168.7 | 11.5 | 86.0 |
| EX10 | No | No | 3.123 | 1.72 | 11.7 | 191.1 | 169.4 | 11.3 | 85.8 |
| EX11 | No | No | 3.121 | 1.05 | 10.5 | 190.6 | 169.0 | 11.3 | 86.2 |
| EX12 | No | No | 3.121 | 1.33 | 10.8 | 190.8 | 169.1 | 11.4 | 85.7 |
| EX13 | No | No | 3.120 | 1.20 | 10.2 | 191.6 | 170.5 | 11.0 | 86.2 |
| EX14 | No | No | 3.114 | 2.04 | | | | | |
| EX15 | No | No | 3.106 | 3.33 | 10.8 | 191.5 | 169.4 | 11.6 | 85.6 |
| EX16 | No | No | 3.097 | 4.17 | 10.8 | 191.4 | 170.0 | 11.2 | 85.6 |
| EX17 | Yes | No | 3.035 | / | 11.5 | 190.1 | 165.3 | 13.0 | 84.0 |
| EX18 | No | Yes | 3.161 | / | 10.3 | 177.2 | 154.7 | 12.7 | 86.0 |
| EX19 | No | No | 3.118 | 3.03 | 10.2 | 177.8 | 157.1 | 11.7 | 86.8 |
| EX20 | No | No | 3.122 | 1.61 | 13.0 | 199.6 | 178.9 | 10.4 | 85.9 |
| EX21 | Yes | No | 3.027 | / | 12.8 | 200.3 | 176.2 | 12.0 | 81.9 |

TABLE 3A

Example NMC precursors for Li-Me-O$_2$ cathode mass production

| | Precursor | Peak intensity | Lithiation | Coin cell performance | | | |
|---|---|---|---|---|---|---|---|
| N° | Ni/Mn/Co | ratio (R) | condition | CQ (mAh/g) | DQ (mAh/g) | Qirr (W) | 3 C rate |
| EX2-I | 50/30/20 | 0.43 | 3 kg in tray | 190.7 | 168.7 | 11.5 | 85.2 |
| EX10-I | 50/30/20 | 1.72 | 3 kg in tray | 191.1 | 169.4 | 11.3 | 85.5 |
| EX2-II | 50/30/20 | 0.43 | 7 kg in tray | 190.3 | 163.0 | 14.4 | 83.0 |
| EX10-II | 50/30/20 | 1.72 | 7 kg in tray | 190.9 | 166.7 | 12.7 | 84.5 |

TABLE 3B

Example NMC precursors for Li—Me—$O_2$ cathode mass production -ctd.

| No | Slurry viscosity after 0.5 hrs. (cps) | Specific capacity at 0.2 C (mAh/g) | Discharge capacity at −20° C. (%) | 3 C rate (%) | Hot box T at failure (° C.) |
|---|---|---|---|---|---|
| EX2-I | 2978 | 161.4 | 70.4 | 87.2 | 165.2 |
| EX10-I | 2132 | 162.0 | 71.1 | 90.1 | 169.0 |
| EX2-II | 3535 | 157.6 | 66.7 | 87.7 | 165.5 |
| EX10-II | 2957 | 159.1 | 68.9 | 88.3 | 170.1 |

The invention claimed is:

1. A particulate precursor compound for manufacturing a lithium transition metal oxide powder for use as an active positive electrode material in lithium-ion batteries, the precursor compound having a general formula $Ni_xMn_yCo_zA_aO_v(OH)_w$, wherein $0.15<v<0.30$, $v+w=2$, $0.30\leq x\leq 0.75$, $0.10\leq y\leq 0.40$, $0.10\leq z\leq 0.40$, A being a dopant with $a\leq 0.05$, and $x+y+z+a=1$, the precursor compound comprising a crystal structure having an XRD pattern with twin peaks at $2\theta=38\pm 0.5°$, wherein the twin peaks comprise a left peak having a peak intensity $I_L$, a right peak having a peak intensity $I_R$, and a peak intensity ratio $R=I_R/I_L$ with $R>0.7$, wherein the XRD pattern is free of peaks belonging to one or both of a spinel and an oxyhydroxide compound.

2. The particulate precursor compound of claim 1, wherein the precursor compound has an XRD pattern with twin peaks at $2\theta=38\pm 0.5°$, the twin peaks having a left peak and a right peak, wherein the left peak belongs to an XRD pattern of a $\beta(II)$-Me(OH)$_2$ structure and the right peak belongs to an XRD pattern of an oxidized $\beta(II)$-Me(OH)$_2$ structure, and wherein the weight % of the $\beta(II)$-Me(OH)$_2$ structure in the precursor compound is more than 0 wt % and less than 48 wt %.

3. The particulate precursor compound of claim 1, wherein the precursor compound has an XRD pattern with additional twin peaks at $2\theta=33\pm 0.5°$ and $52\pm 0.5°$.

4. The particulate precursor compound of claim 1, wherein $R<+\infty$.

5. The particulate precursor compound of claim 2, wherein the weight % of the oxidized $\beta(II)$-Me(OH)$_2$ structure in the precursor is <95 wt %.

6. The particulate precursor compound of claim 1, having the general formula $Ni_xMn_yCo_zO_v(OH)_w$, wherein $0.30\leq x\leq 0.60$, $0.20\leq y\leq 0.35$, $0.20\leq z\leq 0.35$, and $x+y+z=1$.

7. A method for preparing the particulate precursor compound of claim 1, comprising:
   providing a metal salt solution comprising Ni, Mn, Co and A,
   adding an alkali hydroxide compound to the metal salt solution, thereby
   precipitating a wet particulate precursor compound comprising a pure hydroxide crystal structure and a quantity of $H_2O$,
   drying the wet particulate precursor compound during a heat treatment at a temperature between 130° C. and 160° C. in vacuum, thereby lowering the $H_2O$ content below 1 wt %,
   continuing to heat treat the dried precursor compound, thereby removing between 0.15 and 0.30 mole $H_2$ per mole pure hydroxide precursor, and
   cooling the dried particulate precursor compound to room temperature under vacuum.

8. The method of claim 7, wherein the step of cooling the dried particulate precursor compound to room temperature is performed under dry air.

* * * * *